United States Patent
Ichikawa et al.

(10) Patent No.: US 11,081,725 B2
(45) Date of Patent: Aug. 3, 2021

(54) SOLID ELECTROLYTE HAVING MAGNESIUM ION CONDUCTIVITY, AND MAGNESIUM SECONDARY BATTERY CONTAINING THE SAME

(71) Applicant: Panasonic Intellectual Property Management Co., Ltd., Osaka (JP)

(72) Inventors: Kazuhide Ichikawa, Kyoto (JP); Yu Nishitani, Osaka (JP); Hideaki Adachi, Osaka (JP); Takuji Tsujita, Osaka (JP); Daisuke Matsunaka, Nagano (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 57 days.

(21) Appl. No.: 16/366,412

(22) Filed: Mar. 27, 2019

(65) Prior Publication Data

US 2019/0348704 A1 Nov. 14, 2019

(30) Foreign Application Priority Data

May 9, 2018 (JP) .............................. JP2018-090277
Aug. 1, 2018 (JP) .............................. JP2018-144667

(51) Int. Cl.
*H01M 10/054* (2010.01)
*H01M 10/0562* (2010.01)
*H01M 4/13* (2010.01)
*H01M 4/36* (2006.01)
(Continued)

(52) U.S. Cl.
CPC ............ *H01M 10/054* (2013.01); *H01M 4/13* (2013.01); *H01M 4/366* (2013.01); *H01M 10/058* (2013.01); *H01M 10/0562* (2013.01); *H01M 2004/027* (2013.01); *H01M 2004/028* (2013.01); *H01M 2300/0071* (2013.01); *H01M 2300/0094* (2013.01)

(58) Field of Classification Search
CPC ... H01M 2300/0065; H01M 2300/002; H01M 10/056; H01M 10/054; H01M 4/13; H01M 4/366; H01M 10/0562; H01M 10/058
See application file for complete search history.

(56) References Cited

U.S. PATENT DOCUMENTS 5,034,023 A * 7/1991 Thompson .......... H01M 8/2435
205/634
6,053,953 A * 4/2000 Tomiyama ............ H01M 4/382
29/623.1

(Continued)

FOREIGN PATENT DOCUMENTS

JP 2008-235076 10/2008
JP 2018-098172 6/2018
(Continued)

OTHER PUBLICATIONS

Petrova et al. (J. Mater. Res., vol. 12, No. 10, Oct. 1997).*

*Primary Examiner* — Olatunji A Godo
(74) *Attorney, Agent, or Firm* — McDermott Will & Emery LLP (57) ABSTRACT

A solid electrolyte comprises a compound represented by a formula $Mg_xAl_{2-y}M_yO_z$, where M is at least one selected from the group consisting of Si, Ge, Sn, Pb, Ti, and Zr; $0<x<1$; $0.125 \leq y \leq 0.5$; and $3.8 \leq z \leq 4.1$.

17 Claims, 3 Drawing Sheets

(51) Int. Cl.
*H01M 10/058* (2010.01)
*H01M 4/02* (2006.01)

(56) References Cited

U.S. PATENT DOCUMENTS

| | | | | |
|---|---|---|---|---|
| 2007/0224110 A1* | 9/2007 | Fukuda | ................ | C04B 35/465 |
| | | | | 423/598 |
| 2010/0086849 A1* | 4/2010 | Mizuno | ............... | H01M 4/9008 |
| | | | | 429/209 |
| 2012/0219859 A1* | 8/2012 | Doe | ....................... | C01G 49/00 |
| | | | | 429/219 |
| 2014/0004422 A1* | 1/2014 | Yang | ................... | H01M 4/5825 |
| | | | | 429/221 |
| 2014/0287305 A1* | 9/2014 | Wachsman | ........ | H01M 10/0562 |
| | | | | 429/211 |
| 2014/0295278 A1* | 10/2014 | Mizuno | ............... | H01M 10/054 |
| | | | | 429/224 |
| 2015/0228965 A1* | 8/2015 | Ushiroda | ................ | C01B 33/32 |
| | | | | 429/217 |
| 2017/0294675 A1* | 10/2017 | Kubota | ............. | H01M 10/0569 |
| 2018/0159170 A1 | 6/2018 | Fujinoki et al. | | |
| 2018/0159177 A1 | 6/2018 | Tsujita et al. | | |

FOREIGN PATENT DOCUMENTS

| | | |
|---|---|---|
| JP | 2018-107106 | 7/2018 |
| WO | 2016/042594 | 3/2016 |

* cited by examiner

SOLID ELECTROLYTE HAVING MAGNESIUM ION CONDUCTIVITY, AND MAGNESIUM SECONDARY BATTERY CONTAINING THE SAME

BACKGROUND

1. Technical Field

The present disclosure relates to a solid electrolyte and a magnesium secondary battery containing the same.

2. Description of the Related Art

In recent years, magnesium secondary batteries have been expected to be commercialized. The magnesium secondary batteries have higher theoretical capacity density as compared to conventional lithium ion batteries.

WO 2016/042594 discloses a solid electrolyte made of an olivine-structured oxide containing magnesium, silicon, and aluminium.

SUMMARY

In one general aspect, the techniques disclosed here feature a solid electrolyte comprising a compound represented by a formula $Mg_xAl_{2-y}M_yO_z$, where M is at least one selected from the group consisting of Si, Ge, Sn, Pb, Ti, and Zr; $0<x<1$; $0.125\leq y\leq 0.5$; and $3.8\leq z\leq 4.1$.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments are described below in detail with reference to the accompanying drawings.

Descriptions below illustrate general or specific examples. Numerical values, compositions, shapes, thickness, electrical characteristics, the structure of each secondary battery, electrode materials, and the like are examples and are not intended to limit the present disclosure. In addition, constituent elements that are not described in independent claims that indicate the broadest concepts are arbitrary constituent elements.

Solid electrolytes for use in magnesium secondary batteries are mainly described below. In the present disclosure, applications of the solid electrolytes are not limited to the magnesium secondary batteries. The solid electrolytes may be used in, for example, electrochemical devices such as ion concentration sensors.

[1. Solid Electrolyte]

In order to develop solid electrolytes having magnesium ion conductivity, the inventors have focused on spinel-structured materials. In an ideal spinel, $MgAl_2O_4$, oxide ions are cubically close-packed, magnesium ions occupy tetrahedrally coordinated 8a sites, and aluminium ions occupy octahedrally coordinated 16d sites. Vacancies are present at 8c sites neighboring the 8a sites occupied by the magnesium ions. Therefore, spinels are expected as materials in which magnesium ions can isotropically diffuse through pathways connecting 8a sites and 8c sites. However, the spinels actually have low magnesium ion conductivity.

The inventors have inferred that there are two causes below. First, the density of vacancies is low and therefore the number of diffusion paths of magnesium ions is insufficient. Second, the magnesium ions, which are divalent, suffer a strong electrostatic interaction from oxide ions and are unlikely to diffuse.

In order to cope with these causes, the inventors have discovered a novel solid electrolyte below.

A solid electrolyte according to an embodiment of the present disclosure contains a compound represented by the general formula $Mg_xAl_{2-y}M_yO_z$, where M is at least one selected from the group consisting of Si, Ge, Sn, Pb, Ti, and Zr; $0<x<1$; $0.125\leq y\leq 0.5$; and $3.8\leq z\leq 4.1$.

The compound has a spinel structure or a spinel-like structure in the short-range order region. In the compound, trivalent aluminium is partially substituted with a tetravalent element. This enables the solid electrolyte to exhibit excellent magnesium ion conductivity. This is probably because a substitution element having a valence greater than that of aluminium causes a reduction in magnesium density because of the electroneutrality principle and diffusion paths of magnesium ions are thereby sufficiently ensured.

In the above general formula, $x<1$ indicates that magnesium is poor as compared to a spinel with a stoichiometric composition.

In the general formula, $0.125\leq y$ indicates that, on average, one or more magnesium vacancies are present per unit cell. This enables diffusion paths of magnesium ions to be ensured. In the general formula, $y\leq 0.5$ indicates a range in which the spinel structure or the spinel-like structure can be stably maintained.

In the general formula, $3.8\leq z\leq 4.1$ indicates the range of deviation from a stoichiometric composition ($z=4.0$). A deviation in the range $3.8\leq z\leq 4.0$ can result from, for example, the incorporation of about 10 percent of an $MO_2$ phase in the compound or the presence of oxygen defects in the compound. A deviation in the range $4.0<z\leq 4.1$ can result from, for example, the incorporation of about 10 percent of an MgO phase in the compound.

Furthermore, in the general formula, $0.25\leq y\leq 0.35$ and $3.9\leq O_z\leq 3.95$ may be satisfied.

The compound may be one that exhibits magnesium ion conductivity due to the introduction of a substitution element. The crystal structure of the compound need not strictly agree with the spinel structure. The regularity of a specific crystal plane may be partially lost as compared to an ideal spinel structure by, for example, the introduction of the substitution element and/or the repetition of a charge-discharge operation.

The compound may be, for example, a crystal having a single-phase structure or may be an amorphous substance. Whether the compound is crystalline or amorphous can be controlled by the thickness of a film of the solid electrolyte, the structure of a base layer (for example, an electrode layer) on which the solid electrolyte is formed, and/or synthesis conditions such as temperatures. In the case where a thin film of the solid electrolyte is formed on an amorphous base layer, the compound is amorphous.

As used herein, the term "amorphous substance" is not limited to a substance completely lacking a crystal structure and includes substances having a crystalline region in the range of short-range order. The term "amorphous substance" refers to, for example, a substance that exhibits no sharp peak originating from a crystal and/or that exhibits a broad peak originating from an amorphous substance.

The compound can be formed to be amorphous in the form of, for example, a thin film. In this case, the thickness of a film of the solid electrolyte may be, for example, 100 nm to 20 μm and may be 2 μm or less. This enables the occurrence of pinholes in the solid electrolyte film to be suppressed and also enables the resistance to the conduction of magnesium ions to be reduced. When the solid electrolyte film has an ionic conductivity of, for example, $2\times10^{-7}$ S/cm and a thickness of, for example, 100 nm, the resistance of the solid electrolyte film per unit area can be 50 $\Omega/cm^2$ or less.

[2. Method for Forming Solid Electrolyte]

In this embodiment, the solid electrolyte can be formed by, for example, a physical deposition method or a chemical deposition method. Examples of the physical deposition method include a sputtering method, a vapor deposition method, an ion plating method, and a pulsed laser deposition (PLD) method. Examples of the chemical deposition method include an atomic layer deposition (ALD) method, a chemical vapor deposition (CVD) method, a liquid-phase deposition method, a sol-gel method, a metal-organic decomposition (MOD) method, a spray pyrolysis deposition (SPD) method, a doctor blade method, a spin coating method, and a printing technique. Examples of the CVD method include a plasma-enhanced CVD method, a thermal CVD method, and a laser-assisted CVD method. The liquid-phase deposition method is, for example, wet plating. Examples of the wet plating include electroplating, immersion plating method, and electroless plating. Examples of the printing technique include an ink jet method and a screen printing method. However, a method for forming the solid electrolyte is not limited to these methods. The solid electrolyte is preferably deposited by any one of the sputtering method, the vapor deposition method, the PLD method, and the CVD method.

[3. Magnesium Secondary Battery]

[3-1. Configuration]

Figure 1:
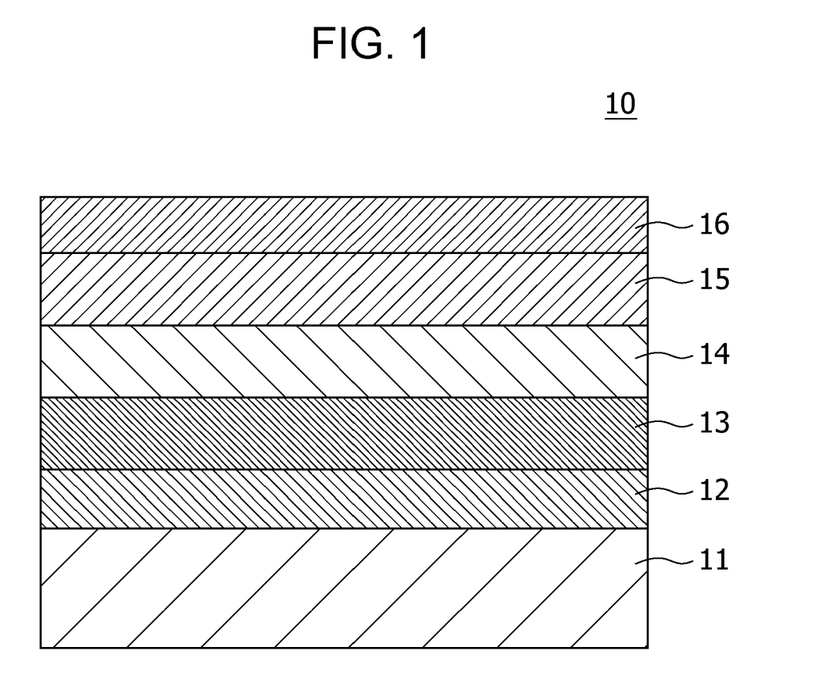
FIG. 1 is a schematic sectional view showing the configuration of a secondary battery according to an embodiment of the present disclosure.

An example of a magnesium secondary battery according to an embodiment of the present disclosure is described with reference to FIG. 1. FIG. 1 is a schematic sectional view showing the configuration of a secondary battery 10 according to this embodiment.

The secondary battery 10 includes a substrate 11, a positive electrode current collector 12, a positive electrode active material layer 13, a solid electrolyte 14, a negative electrode active material layer 15, and a negative electrode current collector 16. A multilayer body composed of the positive electrode current collector 12 and the positive electrode active material layer 13 is an example of a "positive electrode" described herein. A multilayer body composed of the negative electrode current collector 16 and the negative electrode active material layer 15 is an example of a "negative electrode" described herein.

The solid electrolyte 14 may be placed between the positive electrode and the negative electrode and an intermediate layer may be placed therebetween. Magnesium ions can move between the positive electrode active material layer 13 and the negative electrode active material layer 15 through the solid electrolyte 14.

The substrate 11 may be an insulating substrate or an electrically conductive substrate. The substrate 11 may be one that does not change when an organic or inorganic layer is formed thereon. Examples of the substrate 11 include a glass substrate, a plastic substrate, a polymer film, a silicon substrate, a metal plate, a metal foil sheet, and one formed by stacking these. The substrate 11 may be a commercially available one or may be manufactured by a known method.

The positive electrode current collector 12 is made of such an electron conductor that does not cause any chemical change with an ion conductor contained in the positive electrode within the operating voltage range of the secondary battery 10. The operating voltage of the positive electrode current collector 12 with respect to the standard redox potential of magnesium may be within the range of, for example, +2.5 V to +4.5 V. The electron conductor is, for example, metal or an alloy. In particular, the electron conductor may be metal that is at least one selected from the group consisting of copper, chromium, nickel, titanium, platinum, gold, aluminium, tungsten, iron, and molybdenum or an alloy containing the metal. From the viewpoint of electrical conductivity, the resistance to the ion conductor, and redox potential, the electron conductor may be, for example, aluminium, an aluminium alloy, platinum, or gold.

The positive electrode current collector 12 may be formed from a transparent, electrically conductive film. Examples of the transparent, electrically conductive film include an indium tin oxide (ITO) film, an indium zinc oxide (IZO) film, a fluorine-doped tin oxide (FTO) film, an antimony-doped tin oxide (ATO) film, an indium oxide ($In_2O_3$) film, a tin oxide ($SnO_2$) film, and an Al-containing ZnO film.

The positive electrode current collector 12 may be a multilayer film formed by stacking the metal and/or the transparent, electrically conductive film.

The positive electrode active material layer 13 contains a positive electrode active material capable of storing and releasing magnesium ions. Examples of the positive electrode active material include a metal oxide, a polyanion salt, a sulfide, a chalcogenide, and a hydride. Examples of the metal oxide include transition metal oxides such as $V_2O_5$, $MnO_2$, and $MoO_3$ and magnesium-transition metal composite oxides such as $MgCoO_2$ and $MgNiO_2$. Examples of the polyanion salt include $MgCoSiO_4$, $MgMnSiO_4$, $MgFeSiO_4$, $MgNiSiO_4$, $MgCo_2O_4$, and $MgMn_2O_4$. An example of the sulfide is $Mo_6S_8$. An example of the chalcogenide is $Mo_9Se_{11}$.

The positive electrode active material is, for example, a crystalline substance. The positive electrode active material layer 13 may contain two or more types of positive electrode active materials.

The positive electrode active material layer 13 may contain an electrically conductive material and a binding agent as required. That is, the positive electrode active material layer 13 may be a positive electrode mix layer.

The electrically conductive material is not particularly limited and may be an electronically conductive material. Examples of the electrically conductive material include a carbon material, metal, and an electrically conductive polymer. Examples of the carbon material include graphites such as natural graphite including massive graphite and flaky graphite and synthetic graphite, acetylene black, carbon black, Ketjenblack, carbon whiskers, needle coke, and carbon fibers. Examples of the metal include copper, nickel, aluminium, silver, and gold. These materials may be used alone or in combination. From the viewpoint of electronic conductivity and coatability, the electrically conductive material may be, for example, carbon black or acetylene black.

The binding agent is not particularly limited and may have a role in binding active material particles and particles of the electrically conductive material. Examples of the binding agent include fluorine-containing resins such as polytetrafluoroethylene (PTFE), polyvinylidene fluoride (PVdF), and fluorocarbon rubber; thermoplastic resins such as polypropylene and polyethylene; ethylene propylene diene monomer (EPDM) rubber; sulfonated EPDM rubber; and natural butyl rubber (NBR). These materials may be used alone or in combination. The binding agent may be, for example, an aqueous dispersion of cellulose or styrene-butadiene rubber (SBR).

Examples of a solvent for dispersing the positive electrode active material, the electrically conductive material, and the binding agent include N-methylpyrrolidone, dimethylformamide, dimethylacetamide, methyl ethyl ketone, cyclohexanone, methyl acetate, methyl acrylate, diethylenetriamine, N,N-dimethyltrimethylenediamine, ethylene oxide, and tetrahydrofuran. The solvent may be, for example, a mixture of a dispersant and a thickening agent. Examples of the thickening agent include carboxymethylcellulose and methylcellulose.

The positive electrode active material layer 13 is formed, for example, as described below. First, the positive electrode active material, the electrically conductive material, and the binding agent are mixed together. Next, the solvent is added to the mixture, whereby a paste-like positive electrode mix is obtained. Next, the positive electrode mix is applied to a surface of the positive electrode current collector 12, followed by drying. This allows the positive electrode active material layer 13 to be obtained. Incidentally, the positive electrode mix may be compressed for the purpose of increasing the electrode density.

The positive electrode active material layer 13 may be filmy. The positive electrode active material layer 13 may have a thickness of, for example, 500 nm to 20 μm.

The solid electrolyte 14 is the same as the above-mentioned solid electrolyte and is therefore not described in detail.

The negative electrode active material layer 15 contains, for example, a negative electrode active material capable of storing and releasing magnesium ions. An example of the negative electrode active material is a carbon material. Examples of the carbon material include graphite, non-graphitic carbons such as hard carbon and coke, and graphite intercalation compounds.

The negative electrode active material layer 15 may contain two or more types of negative electrode active materials.

The negative electrode active material layer 15 may contain an electrically conductive material and a binding agent as required. That is, the negative electrode active material layer 15 may be a negative electrode mix layer. In the negative electrode active material layer 15, the electrically conductive material, the binding agent, a solvent, and a thickening agent may be the same as those used to describe the positive electrode active material layer 13.

The negative electrode active material layer 15 may be filmy. The negative electrode active material layer 15 may have a thickness of, for example, 500 nm to 20 μm.

For example, a metal negative electrode layer capable of dissolving and precipitating metallic magnesium may be used instead of the negative electrode active material layer 15. In this case, in FIG. 1, the negative electrode active material layer 15 corresponds to the metal negative electrode layer. Alternatively, when the negative electrode current collector 16 doubles as the metal negative electrode layer, the negative electrode active material layer 15 may be omitted.

The metal negative electrode layer is made of metal or an alloy. Examples of the metal include magnesium, tin, bismuth, and antimony. The alloy is an alloy of, for example, magnesium and at least one selected from the group consisting of aluminium, silicon, gallium, zinc, tin, manganese, bismuth, and antimony.

The negative electrode current collector 16 is made of such an electron conductor that does not cause any chemical change with an ion conductor contained in the negative electrode within the operating voltage range of the secondary battery 10. The operating voltage of the negative electrode current collector 16 with respect to the standard reduction potential of magnesium may be within the range of, for example, +0 V to +1.5 V. The electron conductor may be the same as that used to describe the positive electrode current collector 12.

The positive electrode current collector 12, the positive electrode active material layer 13, the solid electrolyte 14, the negative electrode active material layer 15, and the negative electrode current collector 16 can each be formed by the above-mentioned chemical or physical deposition method.

The shape of the secondary battery 10 in top view may be, for example, rectangular, circular, oval, or hexagonal. The structure of the secondary battery 10 may be cylindrical, prismatic, button-shaped, coin-shaped, or flat.

[3-2. First Modification]

Figure 2:
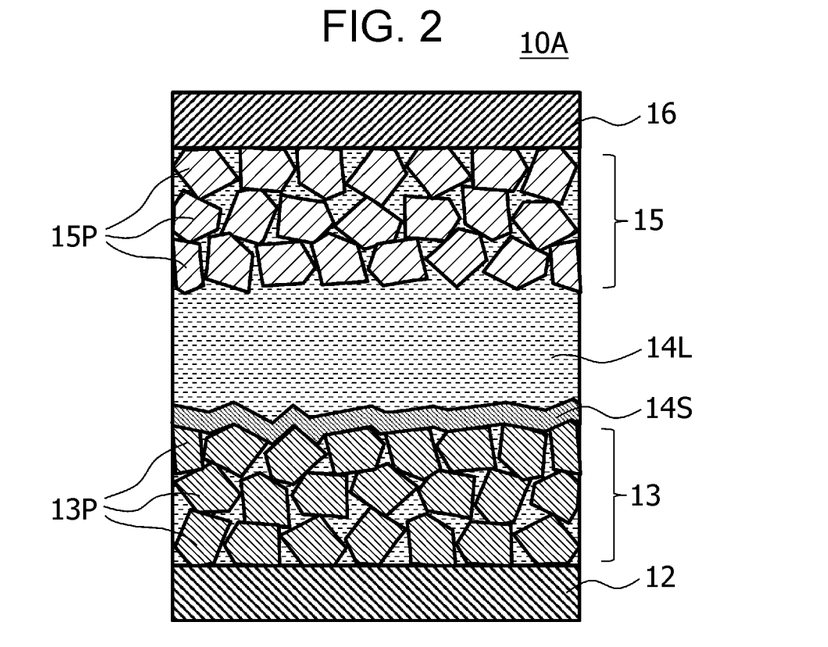
FIG. 2 is a schematic sectional view showing the configuration of a secondary battery according to a first modification of the embodiment.

FIG. 2 is a schematic sectional view showing the configuration of a secondary battery 10A according to a first modification of this embodiment.

The secondary battery 10A includes a positive electrode current collector 12, a positive electrode active material layer 13, a negative electrode active material layer 15, a negative electrode current collector 16, an electrolyte solution 14L, and a solid electrolyte layer 14S. The secondary battery 10A may further include, for example, a separator (not shown) separating the solid electrolyte layer 14S and the negative electrode active material layer 15 from each other. In this case, the electrolyte solution 14L may be impregnated in the separator.

The positive electrode active material layer 13 is placed on the positive electrode current collector 12 and contains a plurality of positive electrode active material particles 13P. In other words, the positive electrode active material particles 13P are placed on the positive electrode current collector 12. The upper surface of the positive electrode active material layer 13 is an irregular surface defined by the positive electrode active material particles 13P. The positive electrode active material layer 13 may contain an electrically conductive material and/or a binding agent as required in addition to the positive electrode active material particles 13P.

The negative electrode active material layer 15 is placed on the negative electrode current collector 16 and contains a plurality of negative electrode active material particles 15P. In other words, the negative electrode active material particles 15P are placed on the negative electrode current collector 16. The lower surface of the negative electrode active material layer 15 is an irregular surface defined by the negative electrode active material particles 15P.

The solid electrolyte layer 14S is a layer placed on the positive electrode active material layer 13 and collectively covers the positive electrode active material particles 13P. The solid electrolyte layer 14S is placed along the irregular surface defined by the positive electrode active material particles 13P.

The solid electrolyte layer 14S has substantially the same composition as that of the solid electrolyte 14. The solid electrolyte layer 14S is amorphous and can be formed in the form of a thin film. The thin film may have a thickness of, for example, 1 nm to 200 nm. In addition, the solid electrolyte layer 14S, which is amorphous, is likely to be formed along the irregular surface of the positive electrode active material layer 13.

The electrolyte solution 14L is filled in a space between the positive electrode active material layer 13 and the negative electrode active material layer 15. Furthermore, the electrolyte solution 14L may be filled in gaps between the positive electrode active material particles 13P and may be filled in gaps between the negative electrode active material particles 15P.

The electrolyte solution 14L is a liquid containing a nonaqueous solvent and a magnesium salt dissolved therein and allows magnesium ions to move depending on an electric field.

Examples of the nonaqueous solvent include cyclic ethers, linear ethers, cyclic carbonates, linear carbonates, cyclic carboxylates, linear carboxylates, pyrocarbonates, phosphates, borates, sulfates, sulfites, cyclic sulfones, linear sulfones, nitriles, and sultones. These compounds may be used alone or in combination.

Examples of the magnesium salt include $MgBr_2$, $MgI_2$, $MgCl_2$, $Mg(AsF_6)_2$, $Mg(ClO_4)_2$, $Mg(PF_6)_2$, $Mg(BF_4)_2$, $Mg(CF_3SO_3)_2$, $Mg[N(CF_3SO_2)_2]_2$, $Mg(SbF_6)_2$, $Mg(SiF_6)_2$, $Mg[C(CF_3SO_2)_3]_2$, $Mg[N(FSO_2)_2]_2$, $Mg[N(C_2F_5SO_2)_2]_2$, $MgB_{10}Cl_{10}$, $MgB_{12}Cl_{12}$, $Mg[B(C_6F_5)_4]_2$, $Mg[B(C_6H_5)_4]_2$, $Mg[BF_3C_2F_5]_2$, and $Mg[PF_3(CF_2CF_3)_3]_2$. These salts may be used alone or in combination.

In the case of a conventional secondary battery which contains an electrolyte solution and which includes no solid electrolyte layer, the electrolyte solution may possibly be degraded because electrons are transferred through a contact area between a positive electrode active material and the electrolyte solution. However, since the secondary battery 10A includes the solid electrolyte layer 14S, which covers the positive electrode active material layer 13, the movement of magnesium ions between the positive electrode active material layer 13 and the electrolyte solution 14L is allowed and the movement of electrons between the positive electrode active material layer 13 and the electrolyte solution 14L can be suppressed. Therefore, electrical characteristics of the secondary battery 10A can be maintained and the degradation of the solid electrolyte 14 can be suppressed. As a result, the secondary battery 10A is stabilized and the life thereof can be extended.

The solid electrolyte layer 14S need not completely prevent the contact of the positive electrode active material layer 13 with the electrolyte solution 14L and may reduce the contact area between the positive electrode active material layer 13 and the electrolyte solution 14L as compared to, for example, a configuration that lacks the solid electrolyte layer 14S.

In particular, in the case where the charge potential of the positive electrode exceeds 4 V in the charge of the secondary battery 10A, the effect of suppressing the degradation of the electrolyte solution 14L by the solid electrolyte layer 14S works significantly better. Design engineers can use, for example, an electrolyte solution material that has been believed to be unusable in a region where the charge potential exceeds 4 V in the secondary battery 10A. Design engineers can use, for example, a nonaqueous solvent for use in conventional lithium ion secondary batteries as a nonaqueous solvent for use in high-capacity magnesium secondary batteries. Thus, the degree of freedom in selecting materials for the secondary battery 10A increases.

In the secondary battery 10A, the electrolyte solution 14L and the solid electrolyte layer 14S can function as an electrolyte. Design engineers enable the electrolyte solution 14L to function as a major component of an electrolyte by adjusting, for example, the distance between the negative electrode active material layer 15 and the solid electrolyte layer 14S and the thickness of the solid electrolyte 14. This enables, for example, a secondary battery having more excellent electrical characteristics as compared to secondary batteries in which electrolytes are all solid (that is, all-solid-state secondary batteries) to be achieved.

In the secondary battery 10A, the solid electrolyte layer 14S covers the positive electrode active material layer 13 so as to collectively cover the positive electrode active material particles 13P. Therefore, the solid electrolyte layer 14S is prepared by a simpler method as compared to, for example, solid electrolyte coatings 14C below. Furthermore, for example, when the positive electrode active material layer 13 contains the electrically conductive material, the solid electrolyte layer 14S can cover the electrically conductive material in addition to the positive electrode active material particles 13P. Therefore, the solid electrolyte layer 14S can suppress a reaction between the electrically conductive material and the electrolyte solution 14L.

Furthermore, the solid electrolyte layer 14S covers the positive electrode active material layer 13 to suppress the formation of a passive film, thereby enabling the stable charge-discharge operation of the secondary battery 10A to be ensured.

[3-3. Second Modification]

Figure 3:
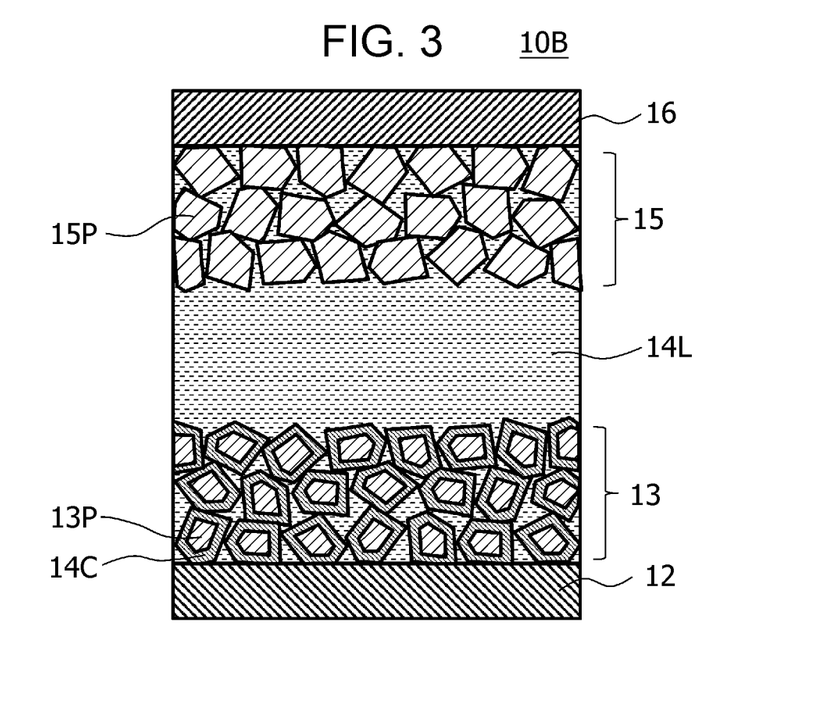
FIG. 3 is a schematic sectional view showing the configuration of a secondary battery according to a second modification of the embodiment.

FIG. 3 is a schematic sectional view showing the configuration of a secondary battery 10B according to a second modification of this embodiment.

The secondary battery 10B has substantially the same configuration as that of the secondary battery 10A except that the secondary battery 10B includes the solid electrolyte coatings 14C instead of the solid electrolyte layer 14S.

The surface of each of a plurality of positive electrode active material particles 13P is covered by a corresponding one of the solid electrolyte coatings 14C. In other words, a positive electrode active material layer 13 is covered by a solid electrolyte composed of the solid electrolyte coatings 14C.

The solid electrolyte coatings 14C have the same composition as that of the above-mentioned solid electrolyte 14. The solid electrolyte coatings 14C are amorphous, are likely to be formed so as to follow the shape of the positive electrode active material particles 13P, and have increased coverage. The solid electrolyte coatings 14C may have a thickness of, for example, 1 nm to 200 nm.

The positive electrode active material layer 13 is formed, for example, as described below. First, the surfaces of the positive electrode active material particles 13P are coated with the solid electrolyte, whereby the solid electrolyte coatings 14C are formed. Thereafter, the coated positive electrode active material particles 13P, an electrically conductive material, and a binding agent are mixed together. Next, an appropriate solvent is added to the mixture, whereby a paste-like positive electrode mix is obtained. Next, the positive electrode mix is applied to a surface of a positive electrode current collector 12, followed by drying.

The solid electrolyte coatings 14C may be formed in such a manner that, for example, the solid electrolyte is deposited on the positive electrode active material particles 13P by a physical or chemical deposition method with the positive electrode active material particles 13P being moved. Alternatively, the solid electrolyte coatings 14C may be formed by, for example, a sol-gel method or the above-mentioned liquid-phase deposition method.

The secondary battery 10B provides substantially the same effects as the various effects described in the first modification. Furthermore, in the secondary battery 10B, each of the positive electrode active material particles 13P is covered by a corresponding one of the solid electrolyte coatings 14C. Therefore, the surfaces of the positive electrode active material particles 13P are not exposed or are unlikely to be exposed in gaps between the positive electrode active material particles 13P. Thus, even if, for example, an electrolyte solution 14L is filled in the gaps, the oxidative degradation of the electrolyte solution 14L can be effectively suppressed and/or the formation of a passive film on a positive electrode effectively suppressed.

[3-4. Other Modifications]

The structure of a secondary battery according to another modification is not limited to the above.

In the secondary battery, for example, a solid electrolyte may collectively cover negative electrode active material particles. That is, in FIG. 2, components represented by reference numerals 12, 13, 15, and 16 may be a negative electrode current collector, a negative electrode active material layer, a positive electrode active material layer, and a positive electrode current collector, respectively.

In the secondary battery, for example, the solid electrolyte may separately cover the negative electrode active material particles. That is, in FIG. 3, components represented by reference numerals 12, 13, 13P, 15, 15P, and 16 may be a negative electrode current collector, a negative electrode active material layer, negative electrode active material particles, a positive electrode active material layer, positive electrode active material particles, and a positive electrode current collector, respectively.

The secondary battery may include, for example, a first solid electrolyte layer collectively or separately covering positive electrode active material particles and a second solid electrolyte layer collectively or separately covering negative electrode active material particles.

For example, at least one of the positive and negative electrodes of the secondary battery may be a plate-shaped or filmy metal electrode.

[4. Experimental Results]

[4-1. Preparation of Samples]

Various samples of solid electrolytes were prepared by a procedure below.

Each substrate was cleaned and was set in a vacuum chamber. Next, the vacuum chamber was evacuated, followed by forming a thin film of a solid electrolyte on the substrate using a high-frequency magnetron sputtering system, SPF-332HS, available from ANELVA Corporation.

Sample 1 of a solid electrolyte was prepared under conditions below.

A substrate used was a sapphire (11-26) substrate.

A target used was a mixture of a $MgAl_2O_4$ powder and a $TiO_2$ powder.

The temperature of the substrate was set to 550° C.

Sputtering gases used were an Ar gas and an $O_2$ gas (a flow rate ratio of 1:1).

The sputtering power was 150 W (RF).

The pressure in the chamber during deposition was 0.8 Pa.

The target thickness of a film was set to 300 nm.

Sample 2 of a solid electrolyte was prepared under conditions below.

A substrate used was a MgO (100) substrate.

Targets used were a $MgAl_2O_4$ sintered body and a $SiO_2$ sintered body.

The temperature of the substrate was set to 600° C.

Sputtering gases used were an Ar gas and an $O_2$ gas (a flow rate ratio of 1:1).

The sputtering power for $MgAl_2O_4$ was 200 W (RF).

The sputtering power for $SiO_2$ was 20 W (RF).

The pressure in the chamber during deposition was 0.5 Pa.

The target thickness of a film was set to 200 nm.

Sample 3 of a solid electrolyte was prepared under conditions below.

A substrate used was a MgO (100) substrate.

A target used was a $MgAl_2O_4$ powder.

The temperature of the substrate was set to 550° C.

Sputtering gases used were an Ar gas and an $O_2$ gas (a flow rate ratio of 1:1).

The sputtering power was 150 W (RF).

The pressure in the chamber during deposition was 0.8 Pa.

The target thickness of a film was set to 300 nm.

[4-2. Composition Analysis]

The composition of each sample was analyzed by X-ray photoelectron spectroscopy (XPS). The element concentration profile of each film in a depth direction was measured by alternately repeating XPS measurement and Ar sputtering using an XPS system, Quantera SXM, available from Ulvac-Phi Inc. In the measured element concentration profile, the composition of the sample was determined from the element concentration of a region excluding the surface vicinity of the sample was contaminated with impurities such as carbon.

As a result, the composition of Sample 1 was $Mg_{0.72}Al_{1.74}Ti_{0.26}O_{3.92}$ and the composition of Sample 2 was $Mg_{0.57}Al_{1.67}Si_{0.33}O_{3.91}$.

[4-3. Structure Analysis]

Each sample was measured by X-ray diffraction using an X-ray diffractometer, X'Pert, available from PANalytical B.V.

An XRD spectrum obtained from Sample 3 by ω-2θ scanning exhibited a peak at 2θ/ω=43.7°. An XRD spectrum obtained from Sample 3 by ϕ scanning at =25.4° and 2θ=36.5° exhibited a peak for every 90° rotation. The former is a peak originating from the (400) plane of a spinel crystal and the latter is a peak originating from the (311) plane of the spinel crystal.

An XRD spectrum obtained from Sample 1 by ω-2θ scanning exhibited a peak at 2θ/ω=44.9°. That is, the ω-2θ spectrum of Sample 1 exhibited a peak similar to the peak originating from the (400) plane of Sample 3. An XRD spectrum obtained from Sample 1 by ϕ scanning at ψ=27.1° and 2θ=37.0° exhibited a peak for every 90° rotation. That is, the ϕ spectrum of Sample 1 exhibited a peak similar to the peak originating from the (311) plane of Sample 3. No peaks originating from impurities were observed in these spectra. Comparisons between the results obtained from Samples 1 and 3 show that Sample 1 has a single-phase spinel structure.

An XRD spectrum obtained from Sample 2 by ω-2θ scanning exhibited a peak at 2θ/ω=43.5°. That is, the ω-2θ spectrum of Sample 2 exhibited a peak similar to the peak originating from the (400) plane of Sample 3. No peaks originating from impurities were observed in this spectrum. Comparisons between the results obtained from Samples 2 and 3 suggest that Sample 2 has a single-phase spinel structure or a structure close thereto.

[4-4. Measurement of Ionic Conductivity]

The ionic conductivity of each sample was measured by an alternating-current impedance method.

First, Pt interdigital electrodes were formed on the film of the sample by RF sputtering. Next, the sample was set on a heating stage in a chamber, followed by replacing the atmosphere in the chamber with nitrogen. Thereafter, the alternating-current impedance of the sample was measured using an electrochemical measurement system, Modulab, available from Solartron Analytical Inc. with the temperature of the sample varied. The amplitude of the alternating-current voltage was 100 mV and the frequency range thereof was 1.0 Hz to 1 MHz.

Figure 4:
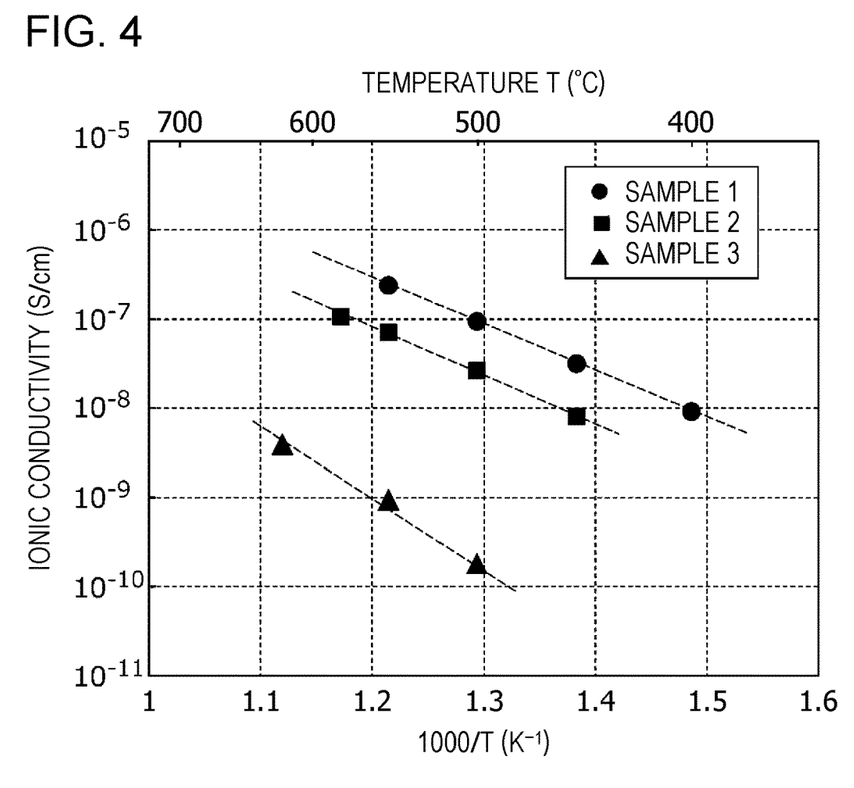
FIG. 4 is a graph showing the relationship between the temperature and ionic conductivity of each of Samples 1 to 3.

FIG. 4 shows a graph obtained by plotting the relationship between the temperature and ionic conductivity of each sample. Table 1 shows the values of temperature and ionic conductivity and the activation energy determined from the slope of each line in the graph shown in FIG. 4.

TABLE 1

| | Composition | Temperature (° C.) | Ionic conductivity (S/cm) | Activation energy (eV) |
|---|---|---|---|---|
| Sample 1 | $Mg_{0.72}Al_{1.74}Ti_{0.26}O_{3.92}$ | 400 | $9.2 \times 10^{-9}$ | 1.10 |
| | | 450 | $3.2 \times 10^{-8}$ | |
| | | 500 | $9.5 \times 10^{-8}$ | |
| | | 550 | $2.4 \times 10^{-7}$ | |
| Sample 2 | $Mg_{0.56}Al_{1.67}Si_{0.33}O_{3.91}$ | 450 | $8.1 \times 10^{-9}$ | 1.13 |
| | | 500 | $2.7 \times 10^{-8}$ | |
| | | 550 | $7.1 \times 10^{-8}$ | |
| | | 580 | $1.1 \times 10^{-7}$ | |
| Sample 3 | $MgAl_2O_4$ | 500 | $1.8 \times 10^{-10}$ | 1.36 |
| | | 550 | $9.5 \times 10^{-10}$ | |
| | | 620 | $4.0 \times 10^{-9}$ | |

As is clear from results shown in FIG. 4 and Table 1, Samples 1 and 2 exhibited higher ionic conductivity as compared to Sample 3. Furthermore, Samples 1 and 2 had lower activation energy as compared to Sample 3.

[5. Calculation Results]

The above experimental results support that the substitution with Ti or Si increases the ionic conductivity of spinels. The increase in ionic conductivity thereof is probably because trivalent aluminium is partially substituted with a tetravalent element as described above. Therefore, it is conceivable that if another tetravalent element can be introduced into a spinel as much as Ti or Si or at a higher substitution ratio, then the ionic conductivity of the spinel can be increased.

Herein, the substitution energy in the case where a substitution element was each of Si, Ge, Sn, Pb, Ti, and Zr was calculated. The substitution energy can be expressed as the difference obtained by subtracting the energy of an unsubstituted system from the energy of the substituted system. In the case where Al atoms in a spinel, $MgAl_2O_4$, are substituted with M atoms, the substitution energy Esub per atom is represented by the following equation:

$$E_{sub} = \frac{E_M - E_0 - N_M(\mu_M - \mu_{Al})}{N_M}$$

where $N_M$ is the number of substituted M atoms, $E_M$ is the total energy of a model obtained by substituting $N_M$ Al atoms in the spinel with $N_M$ M atoms, $E_0$ is the total energy of a model of the unsubstituted spinel, $\mu_{Al}$ is the chemical potential representing the energy of an Al atom in α-$Al_2O_3$, and $\mu_M$ is the chemical potential representing the energy of an M atom in an oxide.

In the case where the substitution element was each of Si, Ge, Sn, Pb, Ti, and Zr, a corresponding one of $SiO_2$ (α-quartz), $GeO_2$ (α-quartz), $SnO_2$ (rutile), $PbO_2$ (rutile), $TiO_2$ (anatase), and $ZrO_2$ (rutile) was used as an oxide. The oxygen chemical potential used was the energy of an oxygen atom in an oxygen molecule. Using an oxide to calculate the chemical potential corresponds to performing synthesis in a sufficient oxygen atmosphere.

Figure 5:
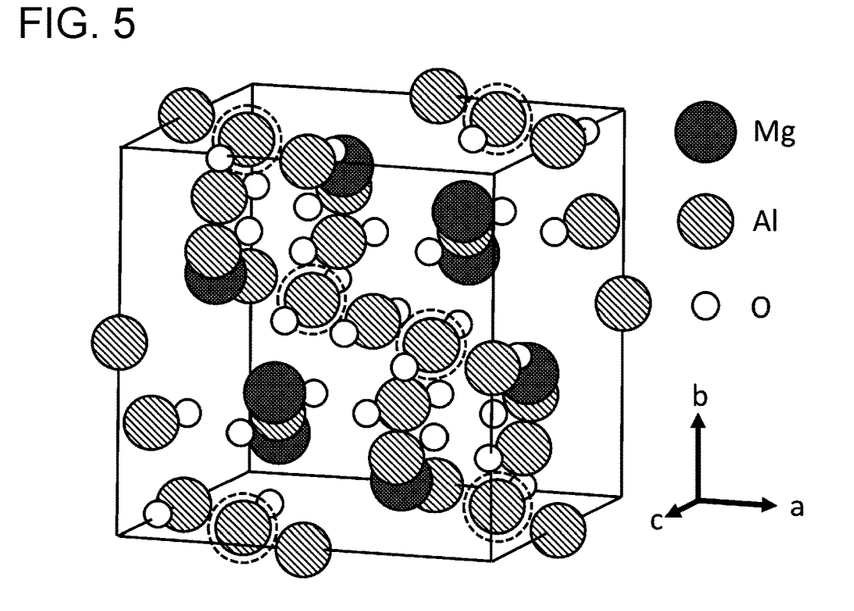
FIG. 5 is a schematic view of a spinel structure for showing the positions of substituted Al sites in calculations.

For each model, the substitution energy in the case where the substitution ratio was 1/16, 1/8, or 1/4 was calculated. A substitution ratio of 1/16, a substitution ratio of 1/8, and a substitution ratio of 1/4 correspond to y=0.125, y=0.25, and y=0.5, respectively, when a substituted composition is represented by $Mg_{1-0.5y}Al_{2-y}M_yO_4$, and correspond to the case where one atom is substituted in the unit cell $(MgAl_2O_4)_8$ of the spinel, which is a parent material, the case where two atoms are substituted therein, and the case where four atoms are substituted therein, respectively. In the unit cell, 16 Al sites were assumed to be crystallographically equivalent. In the case of a one-atom substitution, an arbitrary Al site was selected as a substitution site. In the case of a two-atom substitution, an arbitrary Al site and an Al site closest thereto were selected as substitution sites. In the case of a four-atom substitution, Al sites, each surrounded by a dashed line, in a spinel structure shown in FIG. 5 were selected as substitution sites. The unit cell was assumed to be cubic and the lattice constant thereof was assumed to be 8.166 Å.

The first-principles calculation of energy was performed with the plane-wave density functional theory (DFT) using a calculation program package, Vienna Ab initio Simulation Package (VASP). Calculation conditions were as described below. An exchange-correlation functional used was the Perdew-Burke-Ernzerhof generalized gradient approximation (PBE-GGA) functional. The cutoff energy was assumed to be 520 eV and 5×5×5 k-points centered at the gamma point were used for k-point sampling in reciprocal space. Structural relaxation was performed until the force acting on each atom reached 0.02 eV/Å or less. For a smearing method, Gaussian was used to calculate structural relaxation, and a tetrahedron method was used for energy calculation after structural relaxation.

Table 2 shows calculation results of the substitution energy for each substitution element at substitution ratios.

TABLE 2

| No. | Composition | Substitution element | Substitution ratio | Substitution energy (eV) |
|---|---|---|---|---|
| 1 | $Mg_{0.937}Al_{1.875}Si_{0.125}O_4$ | Si | 1/16 | −3.76 |
| 2 | $Mg_{0.875}Al_{1.75}Si_{0.25}O_4$ | Si | 1/8 | −3.55 |
| 3 | $Mg_{0.75}Al_{1.5}Si_{0.5}O_4$ | Si | 1/4 | −3.48 |
| 4 | $Mg_{0.937}Al_{1.875}Ge_{0.125}O_4$ | Ge | 1/16 | −6.05 |
| 5 | $Mg_{0.875}Al_{1.75}Ge_{0.25}O_4$ | Ge | 1/8 | −6.53 |
| 6 | $Mg_{0.75}Al_{1.5}Ge_{0.5}O_4$ | Ge | 1/4 | −6.19 |

TABLE 2-continued

| No. | Composition | Substitution element | Substitution ratio | Substitution energy (eV) |
|---|---|---|---|---|
| 7 | $Mg_{0.937}Al_{1.875}Sn_{0.125}O_4$ | Sn | 1/16 | −5.50 |
| 8 | $Mg_{0.875}Al_{1.75}Sn_{0.25}O_4$ | Sn | 1/8 | −5.80 |
| 9 | $Mg_{0.75}Al_{1.5}Sn_{0.5}O_4$ | Sn | 1/4 | −5.66 |
| 10 | $Mg_{0.937}Al_{1.875}Pb_{0.125}O_4$ | Pb | 1/16 | −6.27 |
| 11 | $Mg_{0.875}Al_{1.75}Pb_{0.25}O_4$ | Pb | 1/8 | −6.40 |
| 12 | $Mg_{0.75}Al_{1.5}Pb_{0.5}O_4$ | Pb | 1/4 | −6.43 |
| 13 | $Mg_{0.937}Al_{1.875}Ti_{0.125}O_4$ | Ti | 1/16 | −6.29 |
| 14 | $Mg_{0.875}Al_{1.75}Ti_{0.25}O_4$ | Ti | 1/8 | −6.31 |
| 15 | $Mg_{0.75}Al_{1.5}Ti_{0.5}O_4$ | Ti | 1/4 | −6.21 |
| 16 | $Mg_{0.937}Al_{1.875}Zr_{0.125}O_4$ | Zr | 1/16 | −3.73 |
| 17 | $Mg_{0.875}Al_{1.75}Zr_{0.25}O_4$ | Zr | 1/8 | −3.77 |
| 18 | $Mg_{0.75}Al_{1.5}Zr_{0.5}O_4$ | Zr | 1/4 | −3.85 |

As shown in Table 2, the substitution energy in the case where a substitution element was each of Ge, Si, Pb, and Zr was lower than or substantially equal to the substitution energy in the case where a substitution element was Si. Thus, it is supposed that Ge, Si, Pb, or Zr can substitute Al as much as Si or at a higher substitution ratio. This enables materials substituted with these substitution elements to exhibit high ionic conductivity.

What is claimed is:

1. A magnesium secondary battery comprising:
 a positive electrode;
 a negative electrode; and
 a solid electrolyte having magnesium ion conductivity,
 wherein the solid electrolyte comprises: a compound represented by a formula $Mg_xAl_{2-y}M_yO_z$, where M is at least one selected from the group consisting of Si, Ge, Sn, Pb, Ti, and Zr; $0<x<1$; $0.125 \leq y \leq 0.5$; and $3.8 \leq z \leq 4.1$.

2. The magnesium secondary battery according to claim 1, wherein M is Si.

3. The magnesium secondary battery according to claim 1, wherein M is Ti.

4. The magnesium secondary battery according to claim 1, wherein the compound has magnesium vacancies.

5. The magnesium secondary battery according to claim 1, wherein the compound has a single-phase structure.

6. The magnesium secondary battery according to claim 1, wherein the compound is amorphous.

7. The magnesium secondary battery according to claim 1, wherein the positive electrode, the solid electrolyte, and the negative electrode are stacked in that order.

8. The magnesium secondary battery according to claim 1, further comprising:
 an electrolyte solution having magnesium ion conductivity,
 wherein the solid electrolyte covers the positive electrode, and
 the electrolyte solution fills a space between the negative electrode and the solid electrolyte.

9. The magnesium secondary battery according to claim 8, wherein the positive electrode includes a positive electrode active material layer containing positive electrode active material particles, and
 the solid electrolyte is in a form of a layer which is placed on the positive electrode active material layer and which collectively covers the positive electrode active material particles.

10. The magnesium secondary battery according to claim 9, wherein the positive electrode active material layer has an irregular surface defined by the positive electrode active material particles and,
 the solid electrolyte is disposed along the irregular surface.

11. The magnesium secondary battery according to claim 8, wherein the positive electrode includes a positive electrode active material layer containing positive electrode active material particles, and
 the solid electrolyte is in a form of coatings respectively covering the positive electrode active material particles.

12. The magnesium secondary battery according to claim 1, further comprising:
 an electrolyte solution having magnesium ion conductivity,
 wherein the solid electrolyte covers the negative electrode, and
 the electrolyte solution fills a space between the positive electrode and the solid electrolyte.

13. The magnesium secondary battery according to claim 12, wherein the negative electrode includes a negative electrode active material layer containing negative electrode active material particles, and
 the solid electrolyte is in a form of a layer which is placed on the negative electrode active material layer and which collectively covers the negative electrode active material particles.

14. The magnesium secondary battery according to claim 13, wherein the negative electrode active material layer has an irregular surface defined by the negative electrode active material particles, and
 the solid electrolyte is disposed along the irregular surface.

15. The magnesium secondary battery according to claim 12, wherein the negative electrode includes a negative electrode active material layer containing negative electrode active material particles, and
 the solid electrolyte is in a form of coatings respectively covering the negative electrode active material particles.

16. The magnesium secondary battery according to claim 1, wherein $0.56 \leq x < 1$.

17. The magnesium secondary battery according to claim 1, wherein M is at least one selected from the group consisting of Si, Ge, Pb, Ti, and Zr.

* * * * *